United States Patent
Lee et al.

(10) Patent No.: US 8,565,206 B2
(45) Date of Patent: Oct. 22, 2013

(54) BODY COMMUNICATION SYSTEM, MEDIA ACCESS CONTROL BRIDGE, BRIDGE APPARATUS, AND OPERATING METHOD OF BRIDGE APPARATUS

(75) Inventors: Cheolhyo Lee, Daejeon (KR); Hong Soon Nam, Daejeon (KR); Hyung Soo Lee, Daejeon (KR); Sangsung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 115 days.

(21) Appl. No.: 13/335,822

(22) Filed: Dec. 22, 2011

(65) Prior Publication Data
US 2012/0163359 A1    Jun. 28, 2012

(30) Foreign Application Priority Data
Dec. 23, 2010    (KR) .................. 10-2010-0133694

(51) Int. Cl.
*H04W 4/00* (2009.01)
*A61N 1/00* (2006.01)

(52) U.S. Cl.
USPC ........................................... 370/338; 607/60

(58) Field of Classification Search
None
See application file for complete search history.

(56) References Cited

U.S. PATENT DOCUMENTS

| | | | |
|---|---|---|---|
| 2003/0031190 A1 | 2/2003 | Ohnishi | |
| 2007/0211736 A1 | 9/2007 | Sapek et al. | |
| 2007/0239229 A1* | 10/2007 | Masoud et al. | 607/60 |
| 2009/0005016 A1* | 1/2009 | Eng et al. | 455/414.1 |
| 2009/0182388 A1* | 7/2009 | Von Arx et al. | 607/5 |
| 2009/0275293 A1* | 11/2009 | Ida | 455/73 |
| 2010/0039973 A1* | 2/2010 | Cavalcanti et al. | 370/311 |
| 2010/0152534 A1* | 6/2010 | Kim et al. | 600/109 |
| 2010/0260236 A1* | 10/2010 | Batra et al. | 375/146 |
| 2010/0274101 A1* | 10/2010 | Lin et al. | 600/301 |
| 2011/0066381 A1* | 3/2011 | Garudadri et al. | 702/19 |
| 2011/0134820 A1* | 6/2011 | Lee et al. | 370/311 |
| 2012/0170564 A1* | 7/2012 | Kim et al. | 370/338 |

FOREIGN PATENT DOCUMENTS

JP    2003-51834    2/2003
KR    1020090003225    1/2009

OTHER PUBLICATIONS

Lee, Jihyun et al., "A Hybrid Transmission Scheme for Multiple IPTV Streams in UWB Bridged Networks," International Conference on Information Networking, ICOIN, pp. 1-4 (2009).
Misic, Jelena et al., "Bridge Performance in a Multitier Wireless Network for Healthcare Monitoring," IEEE Wireless Communications, vol. 17(1):90-95 (2010).

* cited by examiner

Primary Examiner — Clemence Han
(74) Attorney, Agent, or Firm — Nelson Mullins Riley & Scarborough LLP

(57) ABSTRACT

A human body communication system is disclosed, which includes a plurality of intra-body communication apparatuses, a plurality of extra-body communication apparatuses, a bridge apparatus, and an access point. The bridge apparatus manages connections between the intra-body communication apparatuses and the extra-body communication apparatuses, and performs packet exchange. The access point performs packet exchange between a plurality of bridge apparatuses. The bridge apparatus performs negotiation with communication apparatuses to set up a connection, and manages a path based on the connection setup.

20 Claims, 4 Drawing Sheets

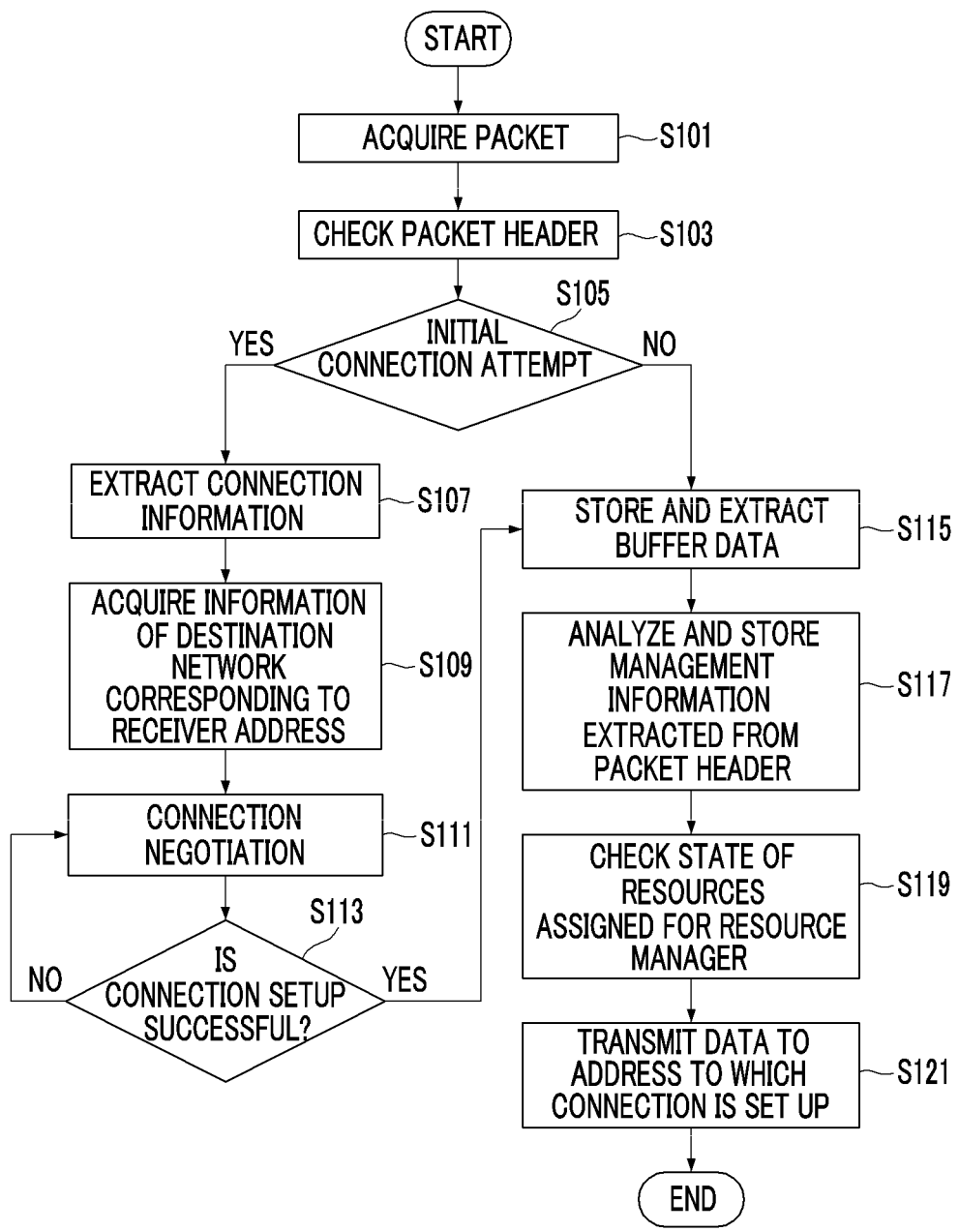

BODY COMMUNICATION SYSTEM, MEDIA ACCESS CONTROL BRIDGE, BRIDGE APPARATUS, AND OPERATING METHOD OF BRIDGE APPARATUS

CROSS-REFERENCE TO RELATED APPLICATION

This application claims priority to and the benefit of Korean Patent Application No. 10-2010-0133694 filed in the Korean Intellectual Property Office on Dec. 23, 2010, the entire contents of which are incorporated herein by reference.

BACKGROUND OF THE INVENTION (a) Field of the Invention

The present invention relates to a body communication system, a body communication apparatus, and a body communication method.

(b) Description of the Related Art

Wireless communication that can be put on a human body or occurs at a place far from the body forms a large part of human body-based communication. With the development of wireless communication technology, however, the technology for collecting various biological information from inside a human body as well as from outside the human body and communicating with a device outside the human body is becoming more and more prevalent. Particularly, the permittivity of a human body is different from that of the air. Thus, when communication from inside the human body is carried out, the transmission distance for the same frequency band is significantly decreased. Accordingly, it is important to select a frequency band and communication method so as to minimize data loss in consideration of human body attenuation.

As there is ongoing research on human body communication, the function of communication of high-speed image and video as well as low-speed bio-information is required. However, the use of communication inside a human body is restrictive due to the problems of current transmission distance and communication stability.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide an apparatus and method for alleviating communication distance limitations and enhancing stability of communication.

An exemplary embodiment of the present invention provides an operation method of a bridge apparatus, the method including: receiving a packet from a first human body-related network using a first communication protocol; checking whether a connection setup for the packet is made; checking a receiver address of the packet based on the connection setup; and if the receiver address of the packet belongs to a second human body-related network, transmitting the packet to the second human body-related network using a second communication protocol.

The operation method of a bridge apparatus may further include, if the receiver address of the packet belongs to a remote human body-related network, transmitting the packet to a base station by using a third communication protocol.

The operation method of a bridge apparatus may further include: if a connection for the packet has not yet been set up, performing negotiation with a communication apparatus of a destination network of the packet; and if the negotiation is successful, setting up a connection for the packet.

The performing of negotiation may include: acquiring information of the destination network; and performing the negotiation based on the information of the destination network.

The operation method of a bridge apparatus may further include, if the negotiation fails, changing the connection setup condition or performing the negotiation again after a predetermined length of time.

The operation method of a bridge apparatus may further include, if the receiver address of the packet belongs to the first human-body network, transmitting the packet to the first human body-related network by using a first communication network.

The first communication protocol may be a protocol for intra-body communication, the second communication may be a protocol for extra-body communication, and the third communication protocol may be a protocol for a wireless LAN.

The operation method of a bridge apparatus may further include: extracting management information from a header of the packet; and checking the state of resources assigned for transmission of the packet based on the management information.

Another exemplary embodiment of the present invention provides a bridge apparatus including: a first media access control part for a first human body-related network; a second media access control part for a second human body-related network; and a media access control bridge part for managing a connection between the first human body-related network and the second human body-related network.

The media access control bridge part may receive a packet from the first human body-related network, and if a receiver address of the packet belongs to the second human-body related network, may send the packet to the second media access control part.

The bridge apparatus may further include a third media access control part for communicating with a base station, wherein, if the receiver address of the packet belongs to a remote human body-related network, the media control access bridge part may send the packet to the third media access control part.

If the receiver address of the packet belongs to the first human body-related network, the media access control bridge part may send the packet to the first media access control part.

If a connection for the packet has not yet been set up, the media access control bridge part may set up a connection for the packet by performing negotiation with the communication apparatus of the destination network of the packet.

Another exemplary embodiment of the present invention provides a media access control bridge including: a first interface manager for exchanging a packet with a first human body-related network; a second interface manager for exchanging a packet with a second human body-related network; and a connection setup manager for setting up a connection when an initial connection is made, sending the packet of which a receiver address belongs to the first human body-related network to the first interface manager, and sending the packet of which the receiver address belongs to the second human body-related network.

The media access control bridge may further include: a first buffer; a second buffer; and a data traffic manager that stores a packet received from the first human body-related network in the first buffer and stores a packet received from the second human body-related network in the second buffer.

The connection setup manager may send a packet whose receiver address belongs to a remote human body-related network to a TCP/IP layer.

If a connection for the packet has not yet been set up, the connection setup manager may set up a connection for the packet by performing negotiation with a communication apparatus of a destination network of the packet.

Yet another exemplary embodiment of the present invention provides a body communication system including: a plurality of first human body-related communication apparatuses forming a first human body-related network; a plurality of human body-related communication apparatuses forming a second human body-related network; and a first bridge apparatus for managing connections between the plurality of first human body-related communication apparatuses and the plurality of second human body-related communication apparatuses.

The body communication system may further include: a second bridge apparatus for managing a connection between a third human body-related network and a fourth human body-related network; and a base station for performing packet exchange between the first bridge apparatus and the second bridge apparatus.

If a connection for the packet has not yet been set up, the first bridge apparatus packet may set up a connection for the setup by performing negotiation with a communication apparatus of a destination network of the packet.

BRIEF DESCRIPTION OF THE DRAWINGS

FIG. 4 is a flowchart showing the operation of a bridge apparatus according to an exemplary embodiment of the present invention.

DETAILED DESCRIPTION OF THE EMBODIMENTS

Figure 1:
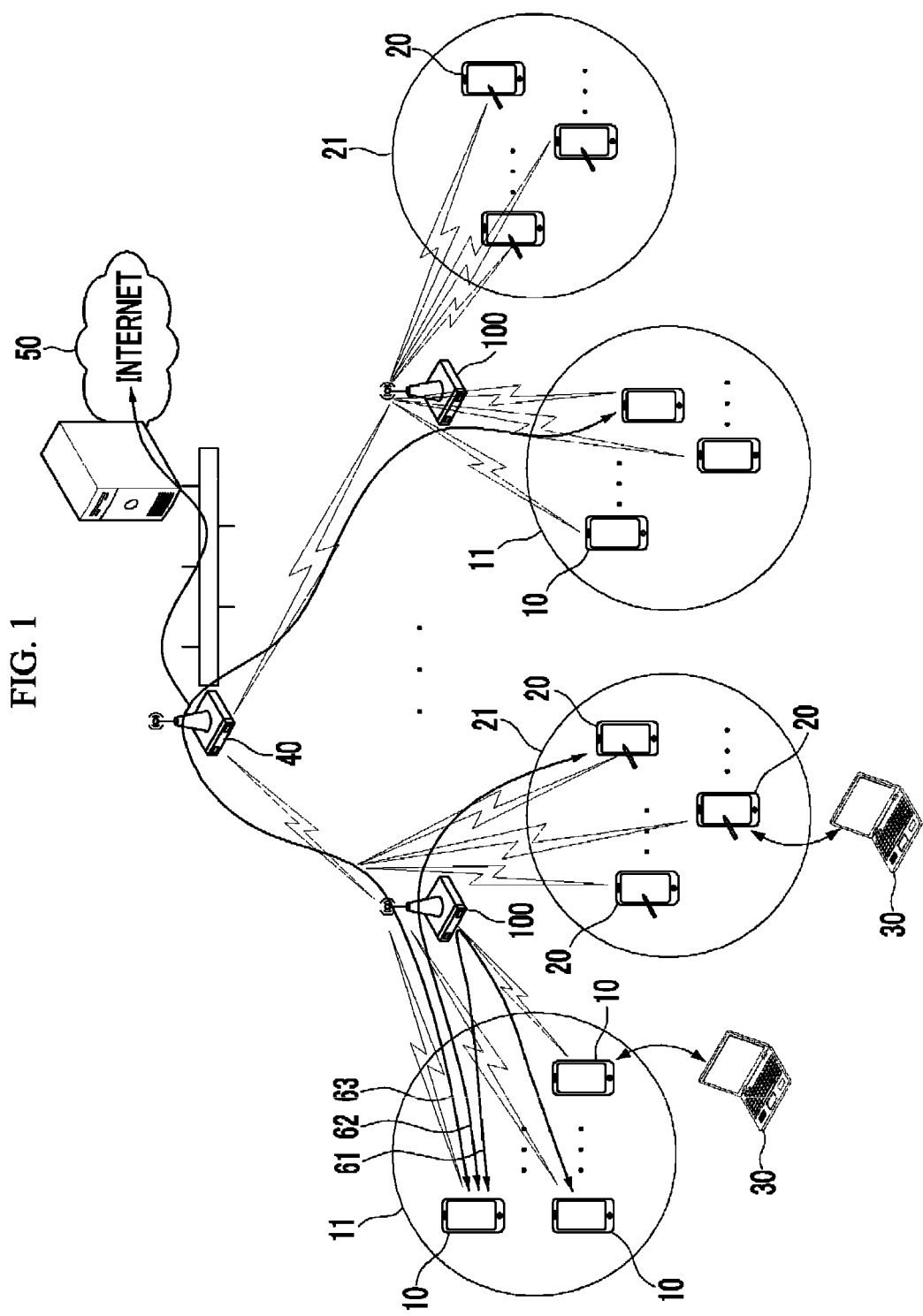
FIG. 1 shows a wireless body area network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a wireless body area network (WBAN) and a communication apparatus within the WBAN according to an exemplary embodiment of the present invention will be described with reference to the accompanying drawings.

FIG. 1 shows a wireless body area network according to an exemplary embodiment of the present invention.

As shown in FIG. 1, a network among a plurality of apparatuses according to an exemplary embodiment of the present invention includes a plurality of bridge apparatuses 100, a plurality of intra-body communication apparatuses 10, a plurality of extra-body communication apparatuses 20, a plurality of external apparatuses 30, a wireless LAN access point 40, and the internet 50.

Each of the bridges apparatuses 100 forms a network 11 between the intra-body communication apparatuses 10 and a network 21 between the extra-body communication apparatuses 20, and communicates with the wireless LAN access point 40.

The intra-body communication apparatus 10 is mounted inside a human body, and communicates with the extra-body communication apparatus 20. Particularly, the intra-body communication apparatus 10 is a sensor mounted inside the human body, and is able to collect medical information or control medical equipment. The transmission range of the intra-body communication apparatus 10 is limited because the effect on the human body should be taken into account.

The extra-body communication apparatus 20 is mounted outside a human body, and operates only outside the human body. The extra-body communication apparatuses 20 include a medical sensor mounted outside the human body, a non-medical sensor apparatus, a video apparatus, and a gaming apparatus.

The external apparatuses 30 include apparatuses such as a personal computer (PC) and a laptop, and are capable of communicating with the intra-body communication apparatuses 10 and/or the extra-body communication apparatuses 20.

The wireless local area network (WLAN) access point 40 is a base station, is wirelessly connected to the plurality of bridge apparatuses 100, and is connected to the internet 50 by wires or wirelessly.

The intra-body communication apparatus 10 according to the exemplary embodiment of the present invention can communicate with other communication apparatuses via the following three paths. First, the intra-body communication apparatus 10 can communicate with another intra-body communication apparatus present in the same network 11 via a path 61 by means of the bridge apparatus 100. Moreover, the intra-body communication apparatus 10 can communicate with the extra-body communication apparatus 20 via a path 62 by using a local bridge apparatus 100. The intra-body communication apparatus 10 can communicate with a remote intra-body communication apparatus 10 or remote extra-body communication apparatus 20 via a path 63 by means of a local bridge apparatus 100, a wireless LAN access point 40, and a remote bridge apparatus 100, or by means of a short-distance bridge apparatus 100, a wireless LAN access point 40, and the internet 50.

Next, a bridge apparatus for a wireless body area network according to an exemplary embodiment of the present invention will be described with reference to FIGS. 2 and 4.

Figure 2:
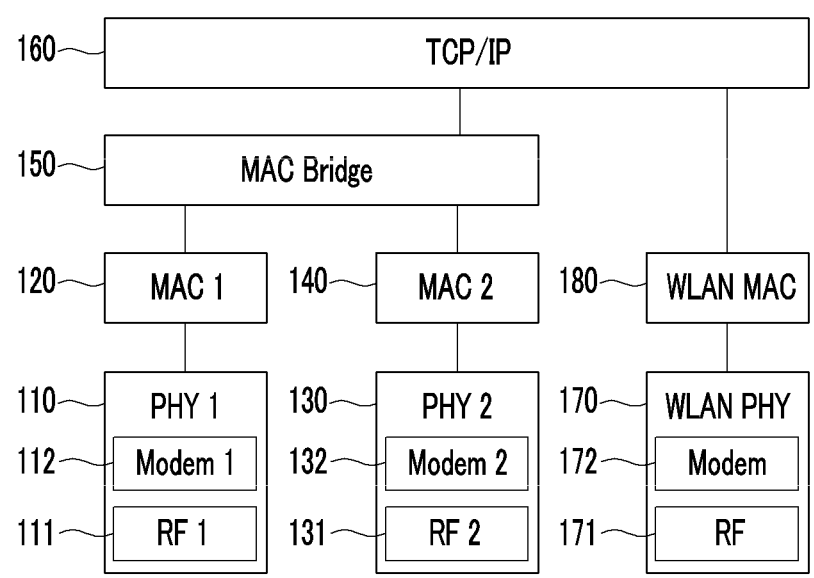
FIG. 2 shows a protocol structure of a bridge apparatus for a wireless body area network according to an exemplary embodiment of the present invention.

FIG. 2 shows a protocol structure of a bridge apparatus for a wireless body area network according to an exemplary embodiment of the present invention.

The bridge apparatus 100 operates in conjunction with a plurality of WBANs, and includes the WLAN connection function for operation in conjunction with the internet. Particularly, FIG. 2 shows the bridge apparatus 100 operating in conjunction with two WBANs.

As shown in FIG. 2, the bridge apparatus 100 according to an exemplary embodiment of the present invention includes a physical layer 110 for intra-body communication, a media access control (MAC) layer 120 for intra-body communication, a physical layer 130 for extra-body communication, a media access control layer 140 for extra-body communication, a media access control bridge layer 150, a transport control protocol/internet protocol (TCP/IP) layer 160, a wireless local area network (WLAN) physical layer 170, and a wireless local area network (WLAN) media access control layer 180. The physical layer 110 for intra-body communication includes a radio frequency (RF) layer 111 for intra-body communication and a modulation/demodulation layer 112 for intra-body communication. The physical layer 130 for extra-body communication includes an RF layer 131 for extra-body communication and a modulation/demodulation layer 132 for extra-body communication 132. The wireless local area network (WLAN) physical layer 170 includes a wireless local area network (WLAN) RF layer 171 and a wireless local area network (WLAN) modulation/demodulation layer 172.

The intra-body communication apparatus 10 includes a physical layer corresponding to the physical layer 110 for intra-body communication, and a MAC layer corresponding to the MAC control layer 120 for intra-body communication.

The extra-body communication apparatus 20 includes a physical layer corresponding to the physical layer 130 for extra-body communication, and an MAC layer corresponding to the MAC control layer 140 for extra-body communication.

The wireless local area network (WLAN) access point 40 includes a physical layer corresponding to the wireless local area network (WLAN) physical layer 170 and a wireless LAN MAC layer 180.

The physical layer 110 and the MAC layer 120 exchange packets with the intra-body communication apparatus 10 by using a communication protocol for intra-body communication. The physical layer 130 and the MAC layer 140 exchange packets with the extra-body communication apparatus 20 by using a communication protocol for intra-body communication. The wireless local area network (WLAN) physical layer 170 and the wireless local area network (WLAN) MAC layer 180 exchange packets with the wireless local area network (WLAN) access point 40 by using a communication protocol for wireless LAN communication. The communication protocol includes a transmission method and frequency band control.

To cause two networks having different physical layer protocol (PHY) and MAC to operate in conjunction with each other, the MAC bridge layer 150 is positioned at a higher level than the MAC bridge layer 120 and the MAC bridge layer 140.

For communication between communication apparatuses in the same network, the MAC bridge layer 150 is not used. Meanwhile, for communication between communication apparatuses in different networks from each other, the MAC bridge layer 150 is used.

Figure 3:
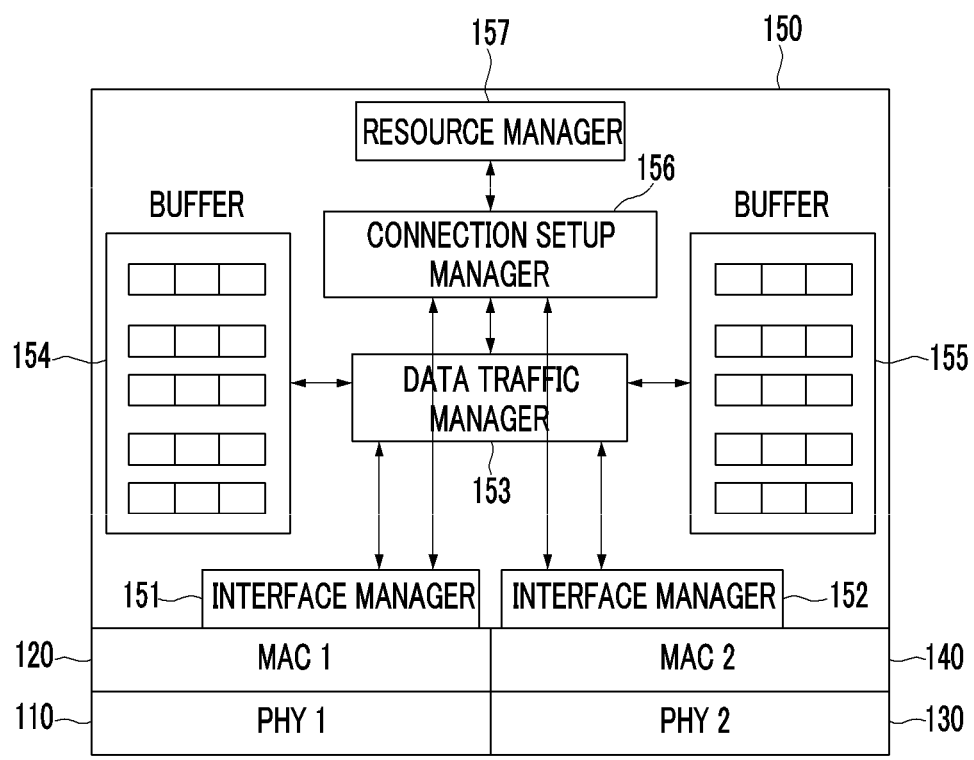
FIG. 3 is a block diagram showing a structure of a MAC bridge layer according to an exemplary embodiment of the present invention.

FIG. 3 is a block diagram showing a structure of a MAC bridge layer according to an exemplary embodiment of the present invention.

As shown in FIG. 3, the MAC bridge layer 150 includes an interface manager 151 for intra-body communication, an interface manager 152 for extra-body communication, a data traffic manager 153, a buffer 154 for intra-body communication, a buffer 155 for extra-body communication, a connection setup manager 156, and a resource manager 157.

The interface manager 151 manages an interface on which the MAC layer 120 exchanges data with the MAC bridge layer 150. The interface manager 152 manages an interface on which the MAC layer 140 exchanges data with the MAC bridge layer 150.

The data traffic manager 153 exchanges data with the MAC layer 120 and the MAC layer 140, and the connection setup manager 156 exchanges management information with the connection setup manager 156 and stores received packets in the buffer 154 and the buffer 155.

The buffer 154 stores data for a while, if necessary, before transmitting data received from a network 11. The buffer 155 stores data for a while, if necessary, before transmitting data received from a network 21. The buffer 154 and the buffer 155 operate based on priority. A WBAN can transmit various data in such formats as urgency connection, random data connection, data connection based on slot assignment, and polling/post connection. Accordingly, the data traffic manager 153 can manage the buffers so that priority is given according to the type of data connection, or subdivide the priority of data traffic into a plurality of classes.

The connection setup manager 156 performs various management functions for transmitting data. The connection setup manager 156 performs a connection setup procedure between a communication apparatus 10 located in the network 11 and a communication apparatus 20 located in the network 21.

For this connection setup procedure, in the case of an initial connection, the setup manager 156 sends a connection setup request to check whether connection setups such as data slot assignment and polling/posting are possible. If the connection setup is possible, the connection setup manager 156 receives a confirm message.

For a connection setup between two networks, the connection setup manager 156 checks information such as a sender address, a receiver address, traffic priority, and connection setup type (urgency connection, random data connection, data connection based on slot assignment, and polling/post connection). Afterwards, the connection setup manager 156 checks state information on whether there are sufficient resources for connection setup, and designates a connection setup. Further, the connection setup manager 156 stores an address table, and manages correlation of addresses between which a connection setup is made.

The resource manager 157 manages resources required for system operation. The resource manager 157 performs the management function of the number of slots assigned for scheduled access using a time-division method and assigned slot numbers.

FIG. 4 is a flowchart showing the operation of a bridge apparatus according to an exemplary embodiment of the present invention.

First, the data traffic manager 153 acquires packets through an interface 151 or an interface 152 (S101). When a packet is acquired through the interface 151, the data traffic manager 153 stores the corresponding packet in the buffer 154. When a packet is acquired through the interface 152, the corresponding packet is stored in the buffer 155.

Meanwhile, the connection setup manager 156 checks the header of the acquired packet (S103).

The connection setup manager 156 acquires the sender address, the receiver address, etc. from the header of the packet, and checks whether a path to the destination has been set up to determine whether an initial connection attempt has been made or if a connection has already been set up (S105).

If the initial connection attempt has been made, the connection setup manager 156 extracts connection information (S107).

The connection setup manager 156 acquires information of a destination network corresponding to the receiver address from the address table (S109), and performs connection negotiation with a communication apparatus belonging to the destination network based on the acquired information (S111).

After the connection negotiation, the connection setup manager 156 determines whether a connection setup has been made (S113).

If the connection setup has not been successful, the connection setup manager 156 can modify the connection setup condition, or postpone the connection setup for a while and then perform the connection negotiation again.

If the connection setup is successful or if the connection has already been set up, the data traffic manager 153 extracts a packet from the buffer 154 or the buffer 155 (S115).

Also, the connection setup manager 156 analyzes and stores management information extracted from the header of the packet (S117).

The connection setup manager 156 checks the state of resources assigned for the transmission of the packet based on the management information extracted through the resource manager 157 (S119).

The connection setup manager 156 transmits the packet to the receiver address to which the connection is set up by using the assigned resources (S121). That is, if the receiver address to which a connection has been set up belongs to the network 11, the connection setup manager 156 transmits the packet to the communication apparatus 10 of the network 10 through the interface manager 151, the MAC layer 120, and the physical layer 110. If the receiver address to which the connection has been set up belongs to the network 21, the connection setup manager 156 transmits the packet to the communication apparatus 20 of the network 21 through the interface manager 152, the MAC layer 140, and the physical layer 130. If the receiver address to which the connection has been set up belongs to the internet 50, the connection setup manager 156 sends the packet to the TCP/IP layer 160.

According to the exemplary embodiments of the present invention, transmission distance limitations can be alleviated by operating apparatuses of two different transmission types in conjunction with each other. Moreover, the present invention enables an apparatus for transmitting a high-speed image such as an endoscope and an external device to operate in conjunction with each other.

The above-described methods and apparatuses are not only realized by the exemplary embodiments of the present invention, but, on the contrary, are intended to be realized by a program for realizing functions corresponding to the configurations of the exemplary embodiments of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An operation method of a bridge apparatus, the method comprising:
   receiving a packet from a first human body-related network using a first communication protocol;
   checking whether a connection setup for the packet is made;
   checking a receiver address of the packet based on the connection setup; and
   if the receiver address of the packet belongs to a second human body-related network, transmitting the packet to the second human body-related network using a second communication protocol.

2. The method of claim 1, further comprising, if the receiver address of the packet belongs to a remote human body-related network, transmitting the packet to a base station by using a third communication protocol.

3. The method of claim 2, wherein:
   if a connection for the packet has not yet been set up, performing negotiation with a communication apparatus of a destination network of the packet; and
   if the negotiation is successful, setting up a connection for the packet.

4. The method of claim 3, wherein
   the performing of negotiation comprises:
   acquiring information of the destination network; and
   performing the negotiation based on the information of the destination network.

5. The method of claim 3, further comprising, if the negotiation fails, changing the connection setup condition or performing the negotiation again after a predetermined length of time.

6. The method of claim 2, further comprising, if the receiver address of the packet belongs to the first human-body network, transmitting the packet to the first human body-related network by using a first communication network.

7. The method of claim 6, wherein the first communication protocol is a protocol for intra-body communication, the second communication is a protocol for extra-body communication, and the third communication protocol is a protocol for a wireless LAN.

8. The method of claim 7, further comprising:
   extracting management information from a header of the packet; and
   checking the state of resources assigned for transmission of the packet based on the management information.

9. A bridge apparatus comprising:
   a first media access control part for a first human body-related network;
   a second media access control part for a second human body-related network; and
   a media access control bridge part for managing a connection between the first human body-related network and the second human body-related network.

10. The bridge apparatus of claim 9, wherein the media access control bridge part receives a packet from the first human body-related network, and if a receiver address of the packet belongs to the second human-body related network, sends the packet to the second media access control part.

11. The bridge apparatus of claim 10, further comprising a third media access control part for communicating with a base station,
   wherein, if the receiver address of the packet belongs to a remote human body-related network, the media control access bridge part sends the packet to the third media access control part.

12. The bridge apparatus of claim 11, wherein, if the receiver address of the packet belongs to the first human body-related network, the media access control bridge part sends the packet to the first media access control part.

13. The bridge apparatus of claim 11, wherein, if a connection for the packet has not yet been set up, the media access control bridge part sets up a connection for the packet by performing negotiation with a communication apparatus of the destination network of the packet.

14. A media access control bridge comprising:
   a first interface manager for exchanging a packet with a first human body-related network;
   a second interface manager for exchanging a packet with a second human body-related network; and
   a connection setup manager for setting up a connection when an initial connection is made, sending the packet of which a receiver address belongs to the first human body-related network to the first interface manager, and sending to the second interface manager the packet of which the receiver address belongs to the second human body-related network.

15. The media access control bridge of claim 14, further comprising:

a first buffer;

a second buffer; and a data traffic manager that stores a packet received from the first human body-related network in the first buffer and stores a packet received from the second human body-related network in the second buffer.

16. The media access control bridge of claim 15, wherein the connection setup manager sends a packet whose receiver address belongs to a remote human body-related network to a TCP/IP layer.

17. The media access control bridge of claim 16, wherein, if a connection for the packet has not yet been set up, the connection setup manager sets up a connection for the packet by performing negotiation with a communication apparatus of a destination network of the packet.

18. A human body communication system comprising:

a plurality of first human body-related communication apparatuses forming a first human body-related network;

a plurality of human body-related communication apparatuses forming a second human body-related network; and a first bridge apparatus for managing connections between the plurality of first human body-related communication apparatuses and the plurality of second human body-related communication apparatuses.

19. The human body communication system of claim 18, further comprising:

a second bridge apparatus for managing a connection between a third human body-related network and a fourth human body-related network; and a base station for performing packet exchange between the first bridge apparatus and the second bridge apparatus.

20. The human body communication system of claim 18, wherein, if a connection for the packet has not yet been set up, the first bridge apparatus packet sets up a connection for the set up by performing negotiation with a communication apparatus of a destination network of the packet.

* * * * *